United States Patent
Yazdanpanah et al.

(10) Patent No.: US 10,317,072 B2
(45) Date of Patent: Jun. 11, 2019

(54) METHOD AND DEVICE FOR CHEMICAL LOOP COMBUSTION OF LIQUID HYDROCARBON FEEDSTOCKS

(71) Applicants: IFP Energies nouvelles, Rueil-Malmaison (FR); Total Raffinage Chimie, Courbevoie (FR)

(72) Inventors: Mahdi Yazdanpanah, Lyons (FR); Tiago Sozinho, Feyzin (FR); Thierry Gauthier, Brignais (FR); Florent Guillou, Ternay (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 641 days.

(21) Appl. No.: 14/783,480

(22) PCT Filed: Mar. 11, 2014

(86) PCT No.: PCT/FR2014/050546
§ 371 (c)(1),
(2) Date: Oct. 9, 2015

(87) PCT Pub. No.: WO2014/162075
PCT Pub. Date: Oct. 9, 2014

(65) Prior Publication Data
US 2016/0061442 A1    Mar. 3, 2016

(30) Foreign Application Priority Data
Apr. 5, 2013   (FR) ..................... 13 53064

(51) Int. Cl.
*F23D 3/40*     (2006.01)
*F23C 10/01*    (2006.01)
(Continued)

(52) U.S. Cl.
CPC ............. *F23C 10/01* (2013.01); *B01J 8/007* (2013.01); *B01J 8/0055* (2013.01); *B01J 8/28* (2013.01);
(Continued)

(58) Field of Classification Search
CPC ................................ F24C 15/2042; B01J 8/32
See application file for complete search history.

(56) References Cited

U.S. PATENT DOCUMENTS 2,446,247 A * 8/1948 Scheineman ............ B01J 8/32
                                                                208/113
2,905,633 A * 9/1959 Rosinski ................ B01J 8/0055
                                                                208/146
(Continued)

FOREIGN PATENT DOCUMENTS

EP    2305366 A1    4/2011
EP    2623182 A1    8/2013
(Continued)

OTHER PUBLICATIONS

International Search Report dated Jul. 17, 2014, issued in International Application No. PCT/FR2014/050546.

*Primary Examiner* — Jason Lau
(74) *Attorney, Agent, or Firm* — Fitch, Even, Tabin, & Flannery LLP

(57) ABSTRACT

The invention is a method for chemical looping (CLC) oxidation-reduction combustion of liquid hydrocarbon feedstocks carried out in a fluidized bed. A liquid hydrocarbon feedstock (2) is partly vaporized on contact with a hot particle solid (1) to form a partly vaporized liquid feedstock and to form coke on the solid prior to contacting partial vaporized liquid feedstock (19) with a redox active mass of particles (12) to achieve combustion of the partially vapor- (Continued)

ized liquid feed (19). The hot solid particles can notably be from a second fluidized-bed particle circulation loop.

14 Claims, 2 Drawing Sheets

(51) Int. Cl.
*B01J 8/28* (2006.01)
*B01J 8/32* (2006.01)
*B01J 8/38* (2006.01)
*B01J 8/00* (2006.01)
*F23C 10/00* (2006.01)
*F23C 6/04* (2006.01)
*F23C 10/10* (2006.01)
*F23C 10/22* (2006.01)

(52) U.S. Cl.
CPC ............. *B01J 8/32* (2013.01); *B01J 8/388* (2013.01); *F23C 6/04* (2013.01); *F23C 10/005* (2013.01); *F23C 10/10* (2013.01); *F23C 10/22* (2013.01); *B01J 2208/00513* (2013.01); *B01J 2208/00902* (2013.01); *F23C 2206/101* (2013.01); *F23C 2900/10003* (2013.01); *F23C 2900/99008* (2013.01); *Y02E 20/346* (2013.01)

(56) References Cited

U.S. PATENT DOCUMENTS

| | | | |
|---|---|---|---|
| 3,527,594 A * | 9/1970 | Busschots | A01N 37/44 |
| | | | 504/312 |
| 8,506,915 B2 | 8/2013 | Abanades García et al. | |
| 2011/0171588 A1 | 7/2011 | Gauthier et al. | |
| 2011/0303875 A1* | 12/2011 | Hoteit | C01B 3/42 |
| | | | 252/373 |
| 2012/0214106 A1 | 8/2012 | Sit et al. | |
| 2012/0230897 A1 | 9/2012 | Abanades García et al. | |
| 2013/0149650 A1 | 6/2013 | Gauthier et al. | |
| 2014/0295359 A1 | 10/2014 | Gauthier et al. | |

FOREIGN PATENT DOCUMENTS

| | | | |
|---|---|---|---|
| FR | | 1134513 A | 4/1957 |
| FR | | 2936301 A1 | 3/2010 |
| FR | | 2960940 A1 | 12/2011 |
| FR | | 2980258 A1 | 3/2013 |
| WO | WO 2014/068205 A1 | | 5/2014 |

* cited by examiner

METHOD AND DEVICE FOR CHEMICAL LOOP COMBUSTION OF LIQUID HYDROCARBON FEEDSTOCKS

FIELD OF THE INVENTION

The present invention relates to the chemical looping oxidation-reduction combustion (CLC) of liquid hydrocarbon feedstocks, notably to a novel technology for implementing this method.

BACKGROUND OF THE INVENTION

Chemical Looping Combustion method or CLC: in the text hereafter, what is referred to as CLC (Chemical Looping Combustion) is an oxidation-reduction or redox looping method on an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced.

In a context of increasing world energy demand, capture of carbon dioxide for sequestration thereof has become an imperative necessity in order to limit greenhouse gas emissions harmful to the environment. The Chemical Looping Combustion (CLC) method allows to produce energy from hydrocarbon-containing fuels while facilitating capture of the carbon dioxide emitted during the combustion.

The CLC method consists in using redox reactions of an active mass, typically a metal oxide, for splitting the combustion reaction into two successive reactions. A first oxidation reaction of the active mass, with air or a gas acting as the oxidizer, allows the active mass to be oxidized.

A second reduction reaction of the active mass thus oxidized, by means of a reducing gas, then allows to obtain a reusable active mass and a gas mixture essentially comprising carbon dioxide and water, or even syngas containing hydrogen and carbon monoxide. This technique thus enables to isolate the carbon dioxide or the syngas in a gas mixture practically free of oxygen and nitrogen.

The combustion being globally exothermic, it is possible to produce energy from this method, in form of vapour or electricity, by arranging exchange surfaces in the active mass circulation loops or on the gaseous effluents downstream from the combustion or oxidation reactions.

U.S. Pat. No. 5,447,024 describes a chemical looping combustion method comprising a first reactor for reduction of an active mass by means of a reducing gas and a second oxidation reactor allowing to restore the active mass in its oxidized state through an oxidation reaction with wet air. The circulating fluidized bed technology is used to enable continuous change of the active mass from the oxidized state to the reduced state and from the reduced state to the oxidized state thereof.

The active mass going alternately from the oxidized form to the reduced form thereof and conversely follows a redox cycle.

Thus, in the reduction reactor, active mass ($M_xO_y$) is first reduced to the state $M_xO_{y-2n-m/2}$ by means of a hydrocarbon $C_nH$ that is correlatively oxidized to $CO_2$ and $H_2O$, according to reaction (1), or optionally to a mixture $CO+H_2$, depending on the proportions used.

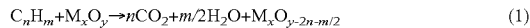

$$C_nH_m + M_xO_y \rightarrow nCO_2 + m/2 H_2O + M_xO_{y-2n-m/2} \qquad (1)$$

In the oxidation reactor, the active mass is restored to its oxidized state ($M_xO_y$) on contact with air according to reaction (2), prior to returning to the first reactor.

$$M_xO_{y-2n-m/2} + (n+m/4)O_2 \rightarrow M_xO_y \qquad (2)$$

In Equations (1) and (2) above, M represents a metal.

The efficiency of the circulating fluidized bed chemical looping combustion (CLC) method is based to a large extent on the physico-chemical properties of the redox active mass.

The reactivity of the redox pair(s) involved and the associated oxygen transfer capacity are parameters that influence the dimensioning of the reactors and the rates of circulation of the particles.

The life of the particles depends on the mechanical strength of the particles and on the chemical stability thereof.

In order to obtain particles usable for this method, the particles involved generally consist of a redox pair or a series of redox pairs selected from among $CuO/Cu$, $Cu_2O/Cu$, $NiO/Ni$, $Fe_2O_3/Fe_3O_4$, $FeO/Fe$, $Fe_3O_4/FeO$, $MnO_2/Mn_2O_3$, $Mn_2O_3/Mn_3O_4$, $Mn_3O_4/MnO$, $MnO/Mn$, $Co_3O_4/CoO$, $CoO/Co$, and of a binder providing the required physico-chemical stability. Interactions with supports such as $Al_2O_3$ are possible.

Liquid feeds, in particular those referred to as "heavy" liquid feeds, i.e. with a high carbon to hydrogen ratio, produce a large amount of greenhouse gas. Thus, the combustion of these fuels is a particularly interesting application for CLC.

Although many studies with gas feeds (essentially methane) and solid feeds have been carried out and have shown the feasibility of the chemical combustion loop for this type of fuels, few satisfactory solutions have been provided for the combustion of heavy liquid feeds.

The principle of fluidized-bed redox chemical looping combustion of liquid feeds is known and it is for example described in patent FR-2,930,771. In relation to CLC methods applied to gas or solid feeds, chemical looping combustion of liquid feeds involves the specific features described below.

The liquid hydrocarbon feed is injected into the dense bed of the reduction reactor and it is preferably atomized within the fluidized bed so as to form fine droplets. Part of the liquid feed is vaporized on contact with the hot redox active mass, in a medium generally above 700° C., and the other part condenses so as to form a coke deposit on the surface of the redox mass due to the thermal cracking resulting from the liquid fuel exposure to very high temperatures. The heavier the feeds, the more they tend to form large amounts of coke. Thus, on a vacuum gas oil or distillate, the amount of coke formed is of the order of 1 to 20% of the feed injected. On an atmospheric residue or a vacuum residue, the amount of coke formed ranges from 10 to 80% depending on the nature of the feed injected. This coke formation depends on the nature of the feeds (coke precursor concentration, determinable by measuring the asphaltene content or the Conradson carbon content). It also depends on the contacting conditions (temperature, ratio of the hydrocarbon flow rate to the active mass flow rate, diameter of the liquid feed droplets, particle diameter, etc.) that govern the heat transfer between the particles and the droplets, and therefore the competition between the physical vaporization phenomenon and the chemical degradation linked with the thermal cracking of the hydrocarbons. After contacting the liquid feed with the redox active mass, two types of combustion reactions occur between the hydrocarbons and the redox active mass. A first reaction consists of the oxidation of the vaporized liquid fuel on contact with the redox active mass. A second reaction, slower than the first, corresponds to the gasification of the coke deposited on the particles producing syngas ($CO+H_2$), which will then rapidly burn with the redox active mass.

This coke formation on the redox mass is a major problem in the field of CLC of liquid hydrocarbon feeds, notably because it causes a significant decrease in the oxygen transfer capacity of the redox active mass. As a consequence, the performances of the CLC process are generally degraded, whether in terms of $CO_2$ capture, of energy production or of syngas production, depending on the applications considered for the CLC process.

Furthermore, insofar as coke formation contributes to slowing down the combustion reactions, it is in general advisable to minimize the formation of coke upon liquid feed injection so as to have the fastest possible combustion reactions.

Finally, the formation of coke on the redox mass is a constraint on the residence time of the active mass in the combustion reactor, which needs to be long enough for all the coke of the particles returning to the combustion zone, after passing through the oxidation reactor, to be removed through the slow gasification process.

Patent FR-2,936,301 provides, in order to overcome the various problems related to the formation of coke upon combustion of liquid feeds, an arrangement of reaction zones suited to the chemical looping combustion of liquid feeds, allowing controlled and optimum injection of liquid on contact with the metal oxides, and control of the particle residence time in the combustion zone. Thus, combustion of the coke deposited on the particles is predominantly achieved in the combustion reactor, which allows to limit the amount of $CO_2$ released in the gaseous effluents at the oxidation reactor outlet and to reach a very high $CO_2$ capture ratio (defined as the ratio of the $CO_2$ discharged in the fumes of the combustion zone through metal oxide reduction to the total $CO_2$ emissions of the process). However, the amounts of oxide involved have to be high in order to enable a long residence time of the coke deposited on the particles and gasification thereof.

SUMMARY OF THE INVENTION

The objective of the present invention is to overcome at least partly the aforementioned problems linked with the chemical looping combustion of liquid feeds and to provide a CLC method for the combustion of liquid hydrocarbon feeds comprising using high-temperature particles distinct from the oxygen carrier particles, which allows to volatilize the liquid hydrocarbon feed and to carry the coke thus formed, in order to prevent the loss of oxygen transfer capacity, through coking, of the oxygen carrier particles. These particles used for carrying the coke can notably form a second fluidized-bed particle circulation loop, the first one being that of the oxygen carrier particles circulating between the oxidation and combustion reactors, thus allowing said particles to be recycled to the process.

The invention thus allows the performances of the CLC method to be improved in terms of $CO_2$ capture and/or of energy production. For example, the invention allows to reach a $CO_2$ capture ratio above 90%.

The present invention also allows to minimize the amount of redox active mass used as oxygen carrier. Thus, it is for example possible, with equal performance, for example for a $CO_2$ capture ratio of 90%, to minimize the size of the CLC plants and therefore the associated investment costs.

According to a first aspect, the invention relates to a method for chemical looping redox combustion of a liquid hydrocarbon feed carried out in a fluidized bed, wherein the liquid hydrocarbon feed is partly vaporized on contact with a hot solid in form of particles so as to form a partly vaporized liquid feed and to form coke on said solid, prior to contacting the partly vaporized liquid feed with a redox active mass in form of particles distinct from the hot solid so as to achieve combustion of the partly vaporized liquid feed.

According to one embodiment, the method comprises the following stages:

partly vaporizing the liquid feed on contact with the hot solid particles in a first reaction zone, the particles of said solid being group A particles in Geldart's classification, sending the effluents from the first reaction zone to a second reaction zone where gasification of the coke of the solid particles is performed, and combustion of the partly vaporized liquid feed and of the gas resulting from the gasification of the coke is carried out through contact with the particles of the redox active mass, said redox active mass particles being group B particles in Geldart's classification, continuing the combustion of the partly vaporized liquid feed and/or of the gas resulting from the gasification of the coke from the second reaction zone in a third reaction zone, separating within the mixture from the third reaction zone the major part of the redox active mass particles and a gas stream containing the major part of the solid particles in a separation zone, carrying out reoxidation of the redox active mass particles from the separation zone in a fourth reaction zone prior to sending at least part of said redox active mass particles back to the second reaction zone.

Advantageously, the solid particles and the gas are separated within the gas stream containing the major part of the solid particles from the separation zone prior to sending said solid particles back to the first reaction zone.

Preferably, the liquid hydrocarbon feed is atomized with an atomizing gas so as to form liquid droplets finely dispersed in the atomizing gas prior to being contacted with the solid particles in the first reaction zone.

The solid can be selected from among the following materials: a used catalytic cracking catalyst, petroleum coke, sand, limestone.

Preferably, the grain size distribution and the density of the solid particles are lower than those of the redox active mass particles. In particular, the grain size distribution of the solid particles is such that more than 90% of the particles have a size ranging between 50 micrometers and 150 micrometers, and their density ranges between 1000 kg/m$^3$ and 1500 kg/m$^3$, and the grain size distribution of the redox active mass particles is such that more than 90% of the particles have a size ranging between 100 micrometers and 500 micrometers, and their density ranges between 2500 kg/m$^3$ and 4500 kg/m$^3$.

The mass proportion of coke deposited on the solid in the first reaction zone advantageously ranges between 1% and 20%.

Preferably, the solid particles contacted with the liquid feed in the first reaction zone have a temperature ranging between 600° C. and 1000° C.

Preferably, the superficial velocity of the gas in the first reaction zone ranges between 1 m/s and 15 m/s, the average residence time for all the particles ranges between 1 second and 20 seconds; the superficial velocity of the gas in the second reaction zone ranges between 0.3 m/s and 3 m/s, the average residence time for all the particles ranges between 0.25 minutes and 20 minutes; the superficial velocity of the gas in the third reaction zone ranges between 1 m/s and 30 m/s, the average residence time of the gas ranges between 1 second and 20 seconds, and the average residence time for all the particles ranges between 2 seconds and 1 minute.

According to a second aspect, the invention relates to a device for chemical looping redox combustion of a liquid hydrocarbon feed carried out in a fluidized bed, comprising:

a first reaction zone for partial vaporization of the liquid hydrocarbon feed and the coke deposit on a hot solid in form of particles, including:
  hydrocarbon liquid feed injection means,
  means for feeding said solid, and
  fluidization gas injection means;

a second reaction zone for gasification of the coke of the solid particles and for combustion of the partly vaporized liquid feed and of the gas resulting from coke gasification, arranged downstream from the first reaction zone and comprising means for feeding a redox active mass in form of particles distinct from the hot solid, a third reaction zone for completing the combustion of the partly vaporized liquid feed and/or of the gas resulting from coke gasification, a separation zone for separating within a mixture from the third reaction zone the major part of the redox active mass particles and a gas stream containing the major part of the solid particles, including:
  a delivery line for said mixture,
  a discharge line for the major part of the redox active mass particles, and
  an outlet line for the gas stream containing the major part of the solid particles, and a fourth reaction zone for reoxidation of the redox active mass particles from the separation zone, including:
  means for feeding redox active mass particles from the separation zone,
  means for injecting an oxidation gas, and
  means for discharging a gas stream containing the major part of the reoxidized redox active mass particles.

Advantageously, the liquid hydrocarbon feed injection means of the first reaction zone comprise means for mixing the liquid feed with an atomizing gas and means for atomizing the liquid feed.

According to one embodiment, the device furthermore comprises a gas/solid separation zone for separating the solid particles and the gas within the gas stream containing the major part of said particles coming from the separation zone and for recycling said particles to the first reaction zone.

According to another embodiment, the first, second and third reaction zones respectively make up three successive parts of a single reactor, a first part at the base of the reactor comprising the first reaction zone being substantially elongate and vertical, and opening into a second part at the center of the reactor comprising the second reaction zone, said second part being extended by a third part of the reactor comprising the third reaction zone, substantially elongate and vertical, the section of said second part of the reactor being greater than that of the first and third parts of the reactor.

According to another embodiment, each reaction zone corresponds to an independent reactor, the independent reactors being connected by lines allowing the particle-containing effluents to be transported.

BRIEF DESCRIPTION OF THE FIGURES

Other features and advantages of the invention will be clear from reading the description hereafter of embodiments given by way of non limitative example, with reference to the accompanying figures wherein.

In the figures, the same reference numbers designate identical or similar elements.

DETAILED DESCRIPTION

The method according to the invention allows chemical looping redox combustion of a liquid hydrocarbon feed. A fluidized bed is used in the oxidation zone and in the reduction zone. According to the invention, the liquid hydrocarbon feed is partly vaporized on contact with a hot solid in form of particles so as to form a partly vaporized liquid feed and to form coke on said solid, prior to contacting the partly vaporized liquid feed with a redox active mass in form of particles to achieve combustion of the partly vaporized liquid feed. The hot solid used for vaporization of the liquid hydrocarbon feed before it is contacted with the redox mass thus acts as a coke carrier in the CLC process, allowing to limit coke deposits on the redox mass particles and therefore oxygen transfer capacity loss of the mass, which has a negative impact on the performances of the CLC process. The CLC method according to the invention allows to obtain for example very high $CO_2$ capture ratios, above 90%.

Figure 1:
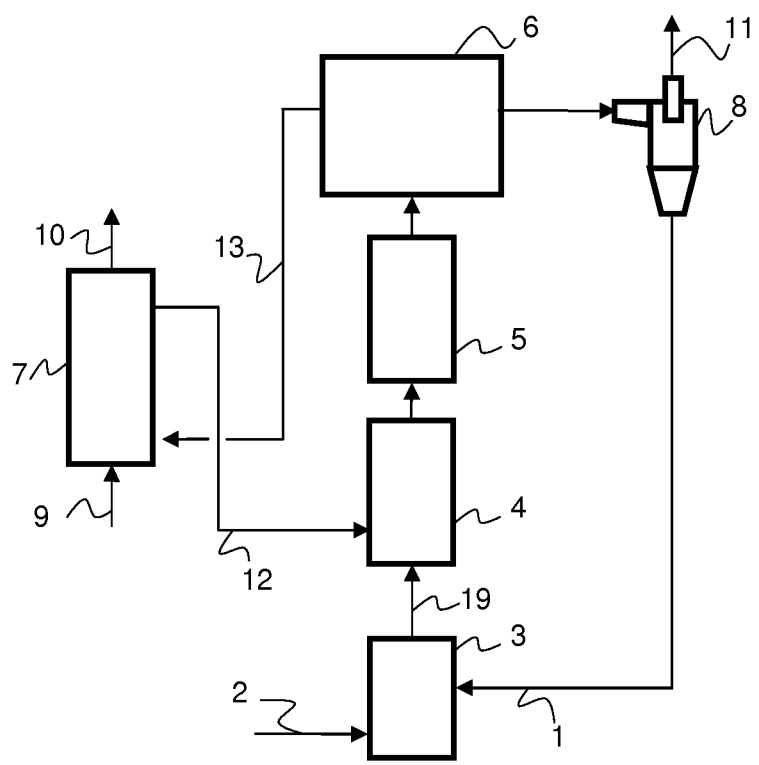
FIG. 1 is a flowsheet of the method according to the invention.
Figure 2:
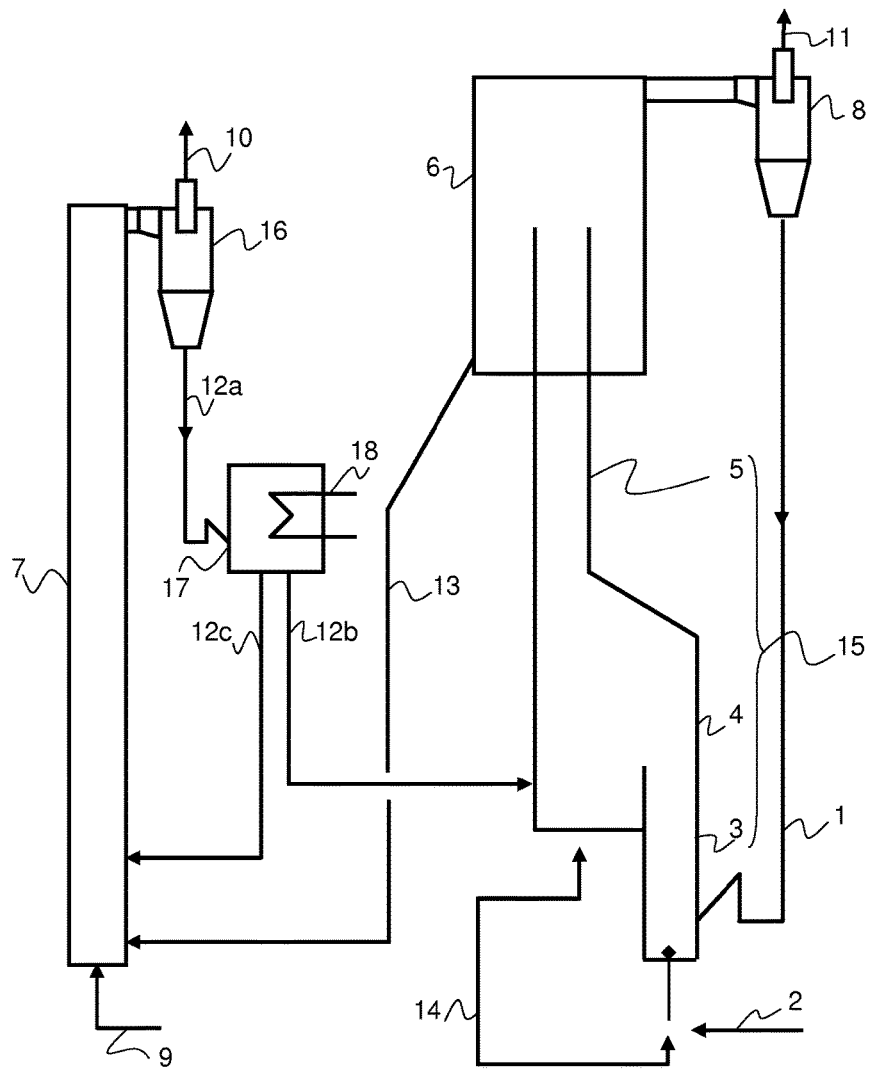
FIG. 2 is a flowsheet of the method according to one embodiment of the invention.

Advantageously, the method comprises the following main stages: partial vaporization of the liquid hydrocarbon feed with coke formation on contact with the coke carrying solid, coke gasification, combustion of the gas resulting from the gasification and vaporization phenomena on contact with the oxygen carrier and reoxidation of the oxygen carrier, these stages being carried out in four main reaction zones 3, 4, 5 and 7, in connection with FIGS. 1 and 2. A stage of separating the particles of the solid from those of the redox active mass is also carried out after combustion. These various stages are detailed in the rest of the description below. Such a method is illustrated by FIGS. 1 and 2.

FIG. 1 illustrates the principle of the CLC method according to the invention. In the diagram of FIG. 1, one embodiment of the CLC method and of the device according to the invention wherein each reaction zone 3, 4, 5 corresponds to an independent reactor is shown, the independent reactors being connected by lines allowing the particle-containing effluents to be transported.

In a first reaction zone 3 or vaporization reactor, a liquid hydrocarbon feed 2 is injected through injection means and a hot solid 1 in form of particles is fed through the supply means. Contacting liquid feed 2 with hot solid particles 1 produces vaporization of part of the liquid fuel, while the rest is deposited on solid particles 1 as coke. The coke thus corresponds here to the solid carbon residue resulting from high-temperature vaporization, typically at a temperature above 400° C., which is the equilibrium temperature of the medium after contact between the droplets and the particles, once vaporization is achieved. Preferably, the temperature of solid particles 1 fed into first reaction zone 3 ranges between 600° C. and 1000° C. The liquid hydrocarbon feed is delivered at a temperature enabling good atomization, generally ranging between 100° C. and 350° C. depending on the viscosity thereof.

Solid particles 1, aside from enabling partial vaporization of liquid feed 2 and thermal cracking of part of this feed, which contributes to markedly improving the combustion kinetics, also act as coke carriers in the CLC process. By thus depositing the coke formed upon partial vaporization of the liquid feed on solid particles 1, the formation of coke on the redox active mass used for combustion of the liquid feed is limited, and therefore the oxygen transfer capacity loss of the redox active mass, due to the surface of the redox active mass particles being covered with coke, is reduced. The performances of the method, such as the $CO_2$ capture ratio and/or energy production, are thus increased.

Solid particles 1 are preferably group A particles in Geldart's classification relative to the aptitude of particles to be fluidized, i.e. fine particles relatively easy to fluidize (Geldart D., Powder Technology, 7, p. 285-292 (1973)). Examples of solid 1 are given below in the description. The physical properties of solid particles 1 are such that they can be easily fluidized and they are apt to be separated from the redox active mass particles. Preferably, the grain size distribution of solid particles 1 is such that more than 90% of the particles have a size (mean Sauter diameter) ranging between 50 micrometers and 150 micrometers, and a density ranging between 1000 $kg/m^3$ and 1500 $kg/m^3$.

In reference to the characterization of materials in form of particles used in the present invention, what is referred to as density of the material in form of particles is the grain density that takes account of porosity.

Liquid feed 2 is preferably atomized, prior to being contacted with hot solid particles 1, with an atomizing gas, preferably water vapour, in order to form liquid droplets finely dispersed in the atomizing gas. The size of the liquid droplets is preferably close to the size of solid particles 1 so as to optimize solid-liquid contact. This atomization enables control of the vaporization conditions of liquid feed 2 so as to minimize coke formation.

The means for injecting liquid feed 2 contained in first reaction zone 3 can thus comprise means for mixing liquid feed 2 with the atomizing gas and means for atomizing liquid feed 2 (not shown in FIG. 1). These means are for example described in patent FR-2,936,301.

Atomizing means allowing to form small-size droplets on high liquid flow rates in the presence of gas are well known to the person skilled in the art. Venturi type injectors can for example be used, where atomization of the liquid is performed in the presence of gas by passage through a restriction, then the suspension flows into a divergent cone prior to being shaped in a spray tip. An impact type injector can also be used, which involves a target onto which the liquid flows at high velocity and is sheared by a gas stream prior to being carried to a jet shaping tip. More complex systems that have already been described in the literature can also be considered. These injectors allow to form, on high unit flow rates (up to 30-60 $m^3$/h liquid), droplets whose size is close to 100 microns or less, with gas flow rates ranging from 3% to 8% by weight of liquid while limiting the dissipation of energy to pressure drops below 10-15 bar.

The droplets are preferably injected on the periphery of first reaction zone 3 where solid particles 1 are transported, by means of a large number of atomizing means arranged around said zone and forming a jet oriented toward the center of the zone.

The droplet jet formed by each atomizer consists of the droplets suspended in a gas (preferably water vapour or a water vapour-$CO_2$ mixture, or the recycled fumes) that has been used at least partly for atomizing the droplets.

The mass ratio of the gas injected to the droplets advantageously ranges between 1 and 15 wt. %, preferably between 3 and 8%.

The droplets and the gas injected with the droplets form a jet that generally flows into first reaction zone 3 at an average superficial velocity ranging between 10 m/s and 150 m/s, preferably between 30 and 100 m/s. The superficial velocity is understood to be the ratio of the volume flow rate of a gas under temperature and pressure conditions passing through the section ($m^3$/s) of the reactor to the section of the reactor ($m^2$). It is important to inject the gas-droplet suspension into first reaction zone 3 at high velocity so as to penetrate the flow of particles.

Preferably, the superficial velocity of the gas in first reaction zone 3 ranges between 1 m/s and 15 m/s.

The void fraction prior to vaporization preferably ranges between 0.5 and 0.9 (50%-90%). After vaporization of the liquid hydrocarbon feed, the void fraction increases and, in general, it preferably ranges on average between 0.8 and 0.98.

The average residence time for all the particles preferably ranges between 1 second and 20 seconds.

First reaction zone 3 corresponds to a transport zone where the renewal of hot solid particles 1 contacted with liquid feed 2, preferably injected as droplets, is provided by a controlled circulation movement so as to ensure that the injected liquid is always in contact with a hot solid that is fed into reaction zone 3 and sent to second reaction zone 4. Indeed, on contact with the liquid, solid 1 cools down. The circulation movement in first reaction zone 3 can be provided by the pressure balance at the reaction zone terminals, for example the pressure balance of the circulation loop of solid 1 when the solid is recycled.

First reaction zone 3 comprises means of injecting a fluidizing gas for fluidizing the particles of solid 1 (not shown in FIG. 1), arranged upstream from the hydrocarbon feed injection. The fluidizing gas is preferably water vapour, $CO_2$, or a mixture thereof, for promoting coke gasification, notably in the next stage. The fluidizing means (not shown) are known to the person skilled in the art, such as, for example, flat or truncated distribution grates, distribution rings or spargers.

It should be noted that the injection of droplets in a dense fluidized bed, where the fluidization rate of the particles is lower than the transport rate of the particles and where the circulation of solids intrinsically depends on the fluidization quality and on the reactor geometry, is in this respect not satisfactory. The liquid droplets are therefore preferably injected into a line where hot solid particles 1 are transported, renewal of these particles on contact with the droplets depending then only on the pressure balance at the transport line terminals, which can be adjusted when dimensioning the plant, or during operation by adjusting the pressure difference between the circulation loop elements. Therefore, in the method according to the invention, first reaction zone 3 is preferably substantially elongate and vertical. The operating conditions at the terminals of this transport zone (flow rates, pressure) are so selected that the superficial velocity of the gas after vaporization of liquid feed 2 is higher than the transport rate of solid particles 1.

The mass ratio of the flow rate of solid particles 1 to the flow rate of liquid 2 typically ranges between 1 and 100, preferably between 1 and 30, so as to provide enough energy to the droplets through contact with the particles on the one hand, in order to maximize the interfacial surface area of solid particles 1 that will condition thermal exchanges and the deposition of coke on each particle on the other hand, and then to provide, through vaporization and reaction of a fraction of liquid feed 2, transport of solid particles 1 by means of the momentum transfer from the gas phase (made up of the gases from the liquid feed and auxiliary gases intended to fluidize the coke-carrying solid and to atomize the liquid feed) to solid particles 1.

At the outlet of this first reaction zone 3, the mass percentage of coke deposited on coke-carrying solid 1 advantageously ranges between 1% and 20%, preferably between 3% and 10%, and more preferably between 5% and 10%. This percentage corresponds to the fraction of matter from the hydrocarbon that settles on the particles due to the non-vaporization of a part thereof. If M is the mass of a particle prior to contacting the feed, the mass becomes M' after injection of the feed and the percentage of deposited coke corresponds to (M'−M)/M*100.

The effluents from first reaction zone 3, i.e. a mixture comprising coked solid particles 1, partly vaporized liquid feed 19 and auxiliary fluidizing and optionally atomizing gases, are fed into a second reaction zone 4 or gasification-combustion reactor 4, and these effluents are contacted with a redox mass in form of particles 12. Second reaction zone 4 comprises means for delivering redox mass particles 12 coming from a fourth reaction zone 7 or oxidation reactor where the redox mass is oxidized.

Second reaction zone 4 can also comprise fluidizing gas injection means (not shown) intended to facilitate mixing of the effluent coming from first reaction zone 3 and entering second reaction zone 4 with metal oxide particles 12.

The redox active mass acts as an oxygen carrier between reaction zones (4, 5) intended for reduction of the partly vaporized liquid feed 19 and oxidation reactor 7. The redox mass can consist of metal oxides such as, for example, Fe, Ti, Ni, Cu, Mn, Co, V oxides, alone or in admixture, derived from ores (ilmenite or pyrolusite for example) or synthetic (for example nickel oxide particles supported on alumina NiO/NiAl2O4), with or without a binder, and it has the required redox properties and the characteristics necessary for fluidization.

The redox mass is given the shape of particles whose grain size is selected so as to facilitate transport and flow of the particles in and between the various reaction zones. The redox mass particles are preferably type B particles in Geldart's classification. Solid particles 1 being preferably type A particles in this classification, it is possible to consider a stage of separating the two types of particles so as to recycle at least the oxygen carrier particles and preferably to recycle the two types of particles: the oxygen carrier particles return to reaction zone 4 after separation and oxidation in reactor 7, and solid particles 1 can return to reaction zone 3 after separation.

For the same reasons, the redox active mass particles preferably have a higher grain size distribution and density than solid particles 1. Advantageously, the grain size distribution of the redox active mass particles is such that more than 90% of the particles have a size ranging between 100 micrometers and 500 micrometers, and a grain density ranging between 2500 kg/m³ and 4500 kg/m³.

The oxygen storage capacity of the redox mass advantageously ranges, depending on the type of material used, between 1 and 15 wt. %. Advantageously, the amount of oxygen actually transferred by the metal oxide ranges between 1 and 2 wt. %, which allows to use only a fraction of the oxygen transfer capacity, ideally less than 30%, so as to limit the risk of mechanical aging or agglomeration of the particles.

The redox mass is referred to as active in connection with the reactive capacities thereof, in the sense that it is apt to act as an oxygen carrier in the CLC process by capturing and releasing oxygen. The redox active mass can be subjected to an activation stage so as to increase the reactive capacities thereof; it can consist of a temperature rise stage, preferably progressive, and preferably in an oxidizing atmosphere (in air for example). This activation stage can for example be carried out in the plant, in particular by delivering the redox mass particles as the process is started, before the redox cycles are initiated with fuel introduction in the process.

In second reaction zone 4, two types of reaction are conducted:

reaction (3) below corresponds to the gasification reaction of the carbon deposited on the particles of oxygen-carrying solid 1, which produces syngas ($CO+H_2$):

$$C + H_2O \rightarrow CO + H_2 \quad (3)$$

all the reactions (4), (5) and (6) below express the oxidation of partly vaporized liquid hydrocarbon feed 19 and of the syngas on contact with the metal oxides:

$$C_nH_m + M_xO_y \rightarrow nCO_2 + m/2 H_2O + M_xO_{y-2n-m/2} \quad (4)$$

$$CO + M_xO_y \rightarrow CO_2 + M_xO_{y-1} \quad (5)$$

$$H_2 + M_xO_y \rightarrow H_2O + M_xO_{y-1} \quad (6)$$

The fluidization conditions are such that this second reaction zone 4 preferably operates under dense fluidized bed conditions. A dense fluidized bed is understood to be a fluidized bed wherein gas fraction cg is below 0.9, preferably below 0.8. In this second zone 4, the gas velocity is preferably low in order to obtain a dense phase, and the residence time of the particles is preferably long.

Advantageously, the superficial velocity of the gas ranges between 0.3 m/s and 3 m/s, and the average residence time for all the particles ranges between 0.25 minutes and 20 minutes.

On average, in second reaction zone 4, the void fraction can range between 0.5 and 0.9, preferably between 0.7 and 0.9.

The temperature in second reaction zone 4 is substantially homogeneous and it is preferably above 800° C., it preferably ranges between 900° C. and 1000° C. so as to minimize the time required for coke gasification.

In a third reaction zone 5 or combustion reaction, combustion is continued so as to complete the oxidation of the unburnt fuel fraction (partly vaporized liquid feed 19 and/or syngas) in gasification-combustion reactor 4 so as to predominantly form $CO_2$ and water vapour. The oxygen required for this oxidation carried out according to reaction equations (3), (4) and (5) is provided by the redox active mass.

Preferably, the average residence time of the gas in this third reaction zone 5 ranges between 1 second and 20 seconds, the average residence time for all the particles ranges between 2 seconds and 1 minute, and the void fraction is above 0.9.

The superficial velocity of the gas is preferably above 1 m/s and below 30 m/s, it preferably ranges between 1 and 15 m/s, more preferably between 3 and 15 m/s, so as to facilitate the transport of all the particles while minimizing the pressure drops in order to optimize the energy efficiency of the process.

This reaction zone 5 preferably operates under dilute fluidized bed conditions. A dilute fluidized bed is understood to be a fluidized bed wherein the volume fraction of particles (solid+redox active mass) is below 10 vol. %.

After this stage, the mixture at the outlet of reaction zone 5 comprises the partly reduced redox active mass particles, the predominantly regenerated solid particles 1, i.e. carrying no more coke, and the gases resulting from combustion, mainly $CO_2$ and water vapour.

The oxygen provided by the redox active mass in reaction zones 4 and 5 is preferably less than 2 mass % in relation to the metal oxide mass.

The temperature in third reaction zone 5 is preferably above 800° C., it more preferably ranges between 900° C. and 1000° C.

After combustion in third reaction zone 5, the gas/particle mixture is sent to a separation zone 6 in order to separate within said mixture the heavy from the light particles. The heavy particles essentially consist of the redox active mass particles to be recycled and the light particles consist of solid particles 1 that are preferably recycled to first reaction zone 3, notably because they may contain unburnt coke.

This separation stage allows to send at least part of the redox active mass particles to oxidation zone 7, then at least partly to gasification-combustion zone 4, thus forming a first circulation loop. Solid particles 1 leaving separation zone 6 can advantageously be sent to first reaction zone 3 (vaporization reactor) in order to be recycled, thus forming a second circulation loop in the method according to the invention.

Such a particle separator is for example described in detail in European patent application EP-2,577,162, and the main features thereof are described hereafter.

Separation zone 6 comprises a feed line for said mixture, a discharge line for the redox active mass particles and an outlet line for the gas stream containing the major part of solid particles 1.

Separation zone 6 can also comprise a line (not shown) for delivery of a gas coming from an external source. This gas can contain oxygen or an oxidizing gas so as to continue the CO and hydrogen combustion reactions in separator 6.

In separation zone 6, the superficial velocity of the gas stream is higher than the terminal rate of fall of solid particles 1 so as to enable entrainment thereof with the gas.

Thus, by subjecting the gas/particle mixture from third reaction zone 5 to a gas flow of imposed velocity, it is possible to achieve "fast" separation between the heavy particles and the light particles.

Fast separation is understood to be a separation achieved in less than 1 minute and preferably less than 20 seconds, this time corresponding to the residence time of the light particles in the dilute phase of the separator.

The dilute phase generally has a level of particles below 5%, or even below 1% (by volume).

Separation zone 6 comprises at least one enclosure including the feed line for said mixture and wherein the discharge line for the major part of redox active mass particles 12 is arranged in the lower part of the enclosure, and the outlet line for the gas stream containing the major part of solid particles 1 is arranged in the upper part of the device. The feed and discharge/outlet parameters are selected so as to create in the enclosure a dense phase in the lower part and a dilute phase in the upper part, and the feed line opens into the dilute phase.

Thus, separation is carried out in the dilute phase of the separator so as to obtain the best separation efficiency possible.

The separation efficiency can be defined by the formula as follows:

X=amount of solid particles 1 entrained with the gas/total amount of solid particles 1 in the particle mixture entering separator 6.

By means of such a separation device, a separation efficiency generally above 70% or even above 80% can be obtained. With this high separation efficiency, it is possible to increase the $CO_2$ capture ratio of the method, which is defined by the amount of $CO_2$ emitted in the combustion zone to the total amount of $CO_2$ emitted in the CLC loop.

Thus, using such a separation device, which is made possible by the use of the two types of particles according to the invention, contributes to reaching a capture ratio above 90%.

Preferably, the gas flow with imposed velocity is entirely induced by the gaseous effluent containing the particles from third reaction zone 5, but it is also possible to adjust the velocity through the supplementary injection of a gas coming from an external source, which can also contribute to the fluidization of a dense phase accumulating the settled particles.

Preferably, the superficial velocity of the gas in the dilute phase of the separation zone is set at a value generally ranging between 30 and 300% of the average terminal rate of fall of the redox active mass particles preferably ranging between 50% and 150%, more preferably between 75% and 125%.

The average terminal rate of fall is obtained from formula (7) hereafter (in: Fluidization Engineering, Butterworth-Heinemann, Daizo Kunii, Octave Levenspiel, p. 80):

$$Vt = \left(\frac{4d_p(\rho_s - \rho_g)g}{3\rho_g C_D}\right)^{\frac{1}{2}} \qquad (7)$$

where:
$d_p$ is the mean diameter of the particles
$\rho_s$ is the density of the particles (kg/m$^3$)
$\rho_g$ is the density of the gas (kg/m$^3$)
$C_D$ is the drag coefficient.

At the outlet of separation zone 6, the gas stream containing the lighter particles is sent to one or more gas/solid separation cyclones 8. At the cyclone(s) outlet, the particle content of gas stream 11 generally ranges between 100 mg/m$^3$ and 1 g/m$^3$. Subsequent treatments can be considered, such as ultimate deducting, water condensation, heat recovery, deSOx, deNOx, etc.

The connection between third reaction zone 5 and separation zone 6 can consist of a divergent cone, open at the top of separation zone 6, at an angle advantageously ranging between 6° and 30°. In this case, the minimum velocity of the gas leaving the cone is above 3 m/s and preferably above 5 m/s so as to reach satisfactory transport conditions at the outlet of third reaction zone 5. Similarly, this divergent cone can consist of an insert arranged at the top of third reaction zone 5. Good distribution of the particle-containing gas mixture is thus provided over the entire cross section of separation zone 6. Thus, the total height of separation zone 6 can be limited.

As regards the particles of redox active mass 12 directly withdrawn from the lower part of separation zone 6, they are sent through a line 13 to fourth oxidation reaction zone 7, made up of one or more fluidized beds arranged in parallel or in series and supplied with an oxidizing gas 9 such as air or water vapour.

Line 13 can feed an enclosure (not shown) acting as a buffer zone. This buffer zone can be materialized by a fluidized bed concentric with and peripheral to third reaction zone 5, fluidization being obtained by injection of a gas delivered through a line (not shown). Advantageously, this gas takes part in the separation in separation zone 6 by being channeled to said separation zone through another line (not shown). In this fluidized bed of the buffer zone, heat exchange means that can be tubes in the wall or in the fluidized bed allowing to recover a variable part, generally 5% to 60%, of the heat produced in the chemical looping combustion process are advantageously arranged in this fluidized bed of the buffer zone. A line (not shown) allows to send the redox active mass particles from the buffer zone to fourth oxidation zone 7 so as to oxidize them again.

In separation zone 6, part of the heavy particles that have settled (predominantly redox active mass particles) can be extracted through a line (not shown) and recycled to reaction zone (4). It is thus possible to promote temperature homogeneity in reaction zones 4, 5 and in separation zone 6.

Fourth reaction zone 7 operates under fluidized bed conditions at a temperature generally ranging between 700° C. and 1200° C., preferably between 950° C. and 1100° C., depending on the circulation rate of the redox active mass particles between this reactor and the combustion zones, and on the oxygen transfer capacity of the material.

Once the oxygen-carrying particles reoxidized, they are sent to second reaction zone 4. Gaseous effluent 10 at the outlet of reactor 7 is depleted in oxygen.

Although not shown in FIG. 1, a cyclone type gas/solid separation device is preferably arranged downstream from reactor 7 so as to allow the oxygen-depleted gas and the redox active mass particles to be separated at the outlet of said reactor.

A second embodiment of the method and of the device according to the invention is illustrated in FIG. 2. This second embodiment essentially differs from the first embodiment of the invention illustrated in FIG. 1 in that first, second and third reaction zones (3, 4, 5) respectively form three successive parts of a single reactor 15. According to this embodiment, the stages of partial vaporization of the liquid feed, of coke gasification and of combustion are carried out in a single reactor 15 whose cross sections of flow can vary depending on the elevation. The first part at the base of reactor 15 comprises first reaction zone 3 where partial vaporization of liquid feed 2 is performed on contact with hot solid particles 1. This first part of the reactor is substantially elongate and vertical, it is generally referred to as riser, and it opens into a second part at the centre of reactor 15 comprising second reaction zone 4 where gasification of the coke of solid particles 1, as well as combustion of the partly vaporized liquid feed and of the gas resulting from gasification of the coke on contact with redox active mass particles 12b, are performed. This second part 4 is extended by a third part of reactor 15 comprising third reaction zone 5. This third part 5 of reactor 15 is substantially elongate and vertical. According to this configuration, second part 4 of reactor 15 has a larger section than first part 3 and third part 5 of reactor 15.

This configuration of a single reactor 15 for three reaction zones (3, 4, 5) notably allows to obtain a more compact device, it simplifies the plant dimensioning and engineering, and it minimizes thermal losses.

Liquid hydrocarbon feed 2 and fluidizing gas 14 are injected into the bottom of the first part (riser) of reactor 15, preferably by means of a feed atomizer. Solid 1 in form of particles is then injected into this first part of reactor 15 so as to partly volatilize the liquid feed and to form coke on solid particles 1. The section of reactor 15 is wider in its second part 4 so as to increase the residence time of the gas phase and of the solid phase in this reaction zone. This allows to ensure the gasification progress of the coke deposited on the surface of solid particles 1, which is a constraining reaction as regards kinetics. The section of reactor 15 is reduced in the third part thereof above the second part, where combustion is completed within a dilute phase bed.

The configuration of reactor 15 as schematically shown in FIG. 2 is not limitative and other configurations where the section of the single reactor varies are possible, for example using a single reactor only for the vaporization and gasification-combustion stages, or for the gasification-combustion and combustion completion stages, or different reactor shapes.

Separation of the two types of particles (redox active mass 12a, 12b, 12c and solid 1) is carried out in a separation zone 6 at the outlet of riser 5 through mass difference. The heavier oxygen-carrying particles are withdrawn in the lower part of separator 6 and the particles of solid 1 are extracted at the separator top with the gases resulting from the combustion. The particles of solid 1 are then separated from the gas stream resulting from the combustion in a cyclone 8 and they are advantageously recycled to reaction zone 3 of the reactor through a siphon so as to start a new cycle. The oxygen carrier particles are sent to oxidation reactor 7, the flow rate being preferably controlled by a non-mechanical L-shaped type valve allowing to control the particle flow rate by controlled injection of an insufflation gas upstream from a bend in a transport bed where a gas is injected for transport of the particles. Various configurations can be used for oxidation reactor 7. A gas/solid separation device 16 of cyclone type is preferably arranged downstream from reactor 7 to allow the oxygen-depleted gas and redox active mass particles 12a to be separated at the outlet of said reactor. A circulating fluidized bed is for example used, wherein a siphon 17 with two outlets divides particle stream 12a into two sub-streams 12c and 12b, sub-stream 12c returning to oxidation reactor 7 and sub-stream 12b returning to gasification-combustion reactor 4. Advantageously, heat exchange means 18, which can be tubes in the wall or in the fluidized bed, allow to recover part of the heat produced in the chemical looping combustion process (for example 5% to 60% of the heat produced).

The liquid feeds that can be used in this fluidized-bed chemical looping combustion process are any liquid hydrocarbon fraction obtained from the production or refining of petroleum whose boiling point under atmospheric conditions is predominantly above 340° C. (i.e. any cut whose distillation curve shows that less than 10% of its constituents boils at a temperature below 340° C.).

The feeds concerned are notably atmospheric residue type cuts (distillation residues obtained under atmospheric conditions), or preferably vacuum residue type cuts (vacuum distillation residues) for which less than 10% of the constituents has a boiling point below 500° C., or finally deasphalting process residues consisting of the precipitate obtained after contacting a paraffinic solvent consisting of an alkane whose number of carbon atoms ranges between 3 and 7.

The feed thus predominantly contains heavy fractions that are difficult to convert and cannot be integrated in fuel bases, alone or in admixture, such as bunker fuels, atmospheric distillation or vacuum distillation residues, conversion process residues (ebullated bed hydroconversion, FCC), asphalts from deasphalting processes, notably propane, butane, pentane, hexane, heptane deasphalting, or bitumens (for example non-distillable Canadian heavy crude fractions).

The percentage of solid residue resulting from vaporization and pyrolysis of a petroleum product is defined by its Conradson carbon. The method according to the invention allows to valorize heavy feeds having a Conradson carbon up to 40%.

Similarly, the method according to the invention is advantageously applicable to heavy feeds with proportions of heptane-precipitating asphaltenes up to 25%.

Solid 1 acts as a coke carrier in form of particles and the physical properties thereof, notably density and grain size, are such that the particles are preferably type A particles in Geldart's classification. Thus, separation between these particles and the redox active mass particles can be considered in the method according to the invention.

Any solid with such properties can be used in the method according to the invention. By way of non limitative example, solid 1 can be a used catalytic cracking catalyst, petroleum coke, limestone or sand.

The following advantages connected with the use of a used catalytic cracking catalyst can be mentioned:

such catalysts represent little-valorized waste and their use in the method according to the invention allows them to be recycled, it may not be necessary to carry out a stage of shaping said catalytic cracking catalysts prior to using them in the method according to the invention since they have already been shaped for the catalytic cracking process, wherein the catalyst comes in form of particles and circulates continuously between a reaction zone and a regeneration zone, the particles belonging to group A of Geldart's periodic classification, with preferably a mean particle diameter (Sauter diameter) ranging between 50 microns and 100 microns, preferably around 70 microns, and the grain density ranges between 1000 kg/m$^3$ and 3500 kg/m$^3$. The grain size distribution of the powder used in the catalytic cracking process is preferably wide. Such properties can be reached by shaping the catalyst using techniques such as spray drying. Under such conditions, it is possible to produce powders whose mean diameter ranges between 50 microns and 100 microns, but which contain large amounts of fine particles (preferably from 5 to 20 wt. %), such catalysts can have the capacity to trap the heavy metals contained in the fuel, for example nickel, vanadium or iron, which can modestly contribute to the oxygen transfer capacity, using a used catalytic cracking catalyst enables catalytic cracking of the vaporized liquid feed in the method according to the invention, which improves the combustion kinetics in the presence of the redox active mass particles favouring the breaking down of heavy molecules into smaller and more reactive molecules.

Such catalysts are used in catalytic cracking processes where the feed is converted through cracking reactions using acid catalysis. It is well known that the catalyst acidity can be obtained using silica or alumina based solids, or complex crystal structures such as zeolites. The catalytic cracking catalyst generally comprises one or more zeolites. The most commonly used zeolite is the USY zeolite. Other zeolites such as ZSM-5 can be used for example. They can be integrated in a silica-alumina matrix of variable composition. In a used catalytic cracking catalyst, the Si/Al ratio of the zeolite is generally close to 4 to 10, preferably 5 to 6. The catalysts can sometimes contain rare earth oxides up to 5 wt. %.

Solid 1 can be petroleum coke. In this case, solid 1 is advantageously itself a fuel that contributes to improving the performances of the process in terms of $CO_2$ capture ratio and/or of energy production. It is then a co-combustion of liquid and solid hydrocarbon feeds. When petroleum coke is used, an attrition device is preferably positioned in first reaction zone 3, comprising for example a high-velocity gas injection system allowing to control the petroleum coke grain size in the plant and to prevent excessive growth of some particles due to the coke deposit coating the particles during vaporization, which can also generate agglomeration of the particles to one another.

Using limestone ($CaCO_3$) as solid 1 is of advantage because limestone is a source that is readily and widely available at an interesting cost. Under the conditions of the method, the limestone is converted to calcium oxide CaO, which is commonly used as combustion fumes DeSOx agent. Using limestone in the method according to the invention thus provides the double advantage of allowing transport of the coke formed during the process and thus of preventing coking of the redox active mass used for combustion, while enabling desulfurization of the gases resulting from combustion in the combustion zones.

The main advantages related to the use of sand as solid 1 lie in the cost and the availability of this material.

EXAMPLES

Example 1: Chemical Looping Combustion Unit for Liquid Feeds without Coke Carrier In this first example, the performances of a combustion unit operating under chemical looping combustion conditions and treating a typical liquid hydrocarbon feed consisting of a petroleum vacuum residue, whose chemical composition is given in Table 1 below, have been calculated. In this example, no particles of a second type acting as coke carrier are used.

The fluidized-bed CLC unit comprises a "fuel" reactor where combustion of the liquid feed introduced with a fluidizing gas occurs on contact with the redox active mass in form of particles, and an "air" reactor where oxidation of the redox active mass is conducted on contact with air, which circulates between the two reactors. The air leaving the air reactor is depleted in $O_2$ and it comprises 10% $CO_2$. The gaseous effluents at the fuel reactor outlet comprise water vapour and 90% $CO_2$. The particle stream flowing from the fuel reactor to the air reactor comprises the partly reduced redox active mass particles and non-oxidized coke.

TABLE 1

| Elements | Wt. % |
| --- | --- |
| C | 85.2 |
| H | 10.3 |
| N | 0.5 |
| S | 4 |

The amount of residue treated in this unit is 30 kg/s. For this example 1, two coke yields have been taken into account:

case A: 30% coke yield for a residue of composition similar to the typical composition and for which 30% of the residue is converted to coke, i.e. around 9 kg/s coke formed, and 70% of the residue is vaporized, case B: 15% coke yield for a residue of composition similar to the typical composition and lighter than the residue in case A, for which 15% of the residue is converted to coke and 85% of the residue is vaporized.

Besides, one considers as the basis for calculation a 90% $CO_2$ capture efficiency, i.e. 90% of the $CO_2$ goes into the gaseous effluent of the fuel reactor. This corresponds to a coke conversion ratio of 66.7% for case A and 33.3% for case B.

The oxygen carrier is used at a rate R0ΔX of 2%, i.e. for every 100 grams of redox active mass, 2 grams of oxygen are used. On the basis of this usage rate, the circulation of the redox active mass particles required to provide combustion of 90% of the residue is 4407.6 kg/s for case A and 4339.9 kg/s for case B (20% solid coking ratio, corresponding to 20 g coke for every 100 g coked oxygen carrier).

The conversion of coke as a function of the residence time and of the temperature of the reactor has been calculated under the operating conditions of the fuel reactor for cases A and B given in Table 2.

TABLE 2

| Operating conditions of the fuel reactor | Case A | Case B |
| --- | --- | --- |
| Temperature (° C.) | 950 | 950 |
| Residence time (seconds) | 369.9 | 92.2 |
| Coke conversion (%) | 66.7 | 33.3 |
| Oxygen carrier inventory (tons) | 1630 | 400 |

Example 2: Chemical Looping Combustion Unit for Liquid Feeds with Coke Carrier

In this second example, the performances of a combustion unit operating under chemical looping combustion conditions and treating a liquid hydrocarbon feed consisting of a petroleum vacuum residue of the same type as in Example 1 (see the chemical analysis given in Table 1) have been calculated. In this example, the method according to the invention, wherein particles distinct from those of the oxygen carrier are used to carry the coke formed upon vaporization of the feed, is implemented.

This unit consists of devices already described in connection with FIG. 1.

The amount of residue treated in this unit is 30 kg/s. As in the first example, two coke yields have been taken into account:

case A: 30% coke yield for a residue of composition similar to the typical composition and for which 30% of the residue is converted to coke, i.e. around 9 kg/s coke formed, and 70% of the residue is vaporized, case B: 15% coke yield for a residue of composition similar to the typical composition and lighter than the residue in case A, for which 15% of the residue is converted to coke and 85% of the residue is vaporized.

One also considers as the basis for calculation a 90% $CO_2$ capture efficiency, i.e. 90% of the $CO_2$ goes into the gaseous effluent of the fuel reactor. This corresponds to a coke conversion ratio of 66.7% for case A and 33.3% for case B.

The oxygen carrier is used at a rate R0ΔX of 2%, i.e. for every 100 grams of redox active mass, 2 grams of oxygen are used. On the basis of this usage rate, the circulation of the redox active mass particles required to provide combustion of 90% of the residue is 4317.4 kg/s for cases A and B.

The coking ratio of the coke-carrying solid is set for this second example at 20%, which corresponds to a coke-carrying solid particles flow rate of 90.2 kg/s for case A and 45.1 kg/s for case B, allowing coke deposition upon vaporization of the liquid feed.

The conversion of coke as a function of the residence time and of the temperature of the reactor has been calculated under the operating conditions of the fuel reactor for cases A and B given in Table 3.

TABLE 3

| Operating conditions of the fuel reactor | Case A | Case B |
| --- | --- | --- |
| Temperature (° C.) | 950 | 950 |
| Residence time (seconds) | 135.4 | 41.4 |
| Coke conversion per pass (%) | 42.3 | 18.3 |
| Overall coke conversion (%) | 66.7 | 33.3 |
| Oxygen carrier inventory (tons) | 584 | 179 |

These results illustrate the performances of the method and of the device according to the invention, notably showing that coking of the redox active mass is greatly limited in comparison with a CLC method of the prior art (Example 1) using no particles distinct from those of the mass as described, as the figures relative to the oxygen carrier inventory show. The present invention allows the amount of redox active mass to be divided by more than 3 compared with Example 1 for case A (heavier residues), and by more than 2 for case B (lighter residues).

The invention claimed is:

1. A method of performing chemical looping oxidation-reduction combustion of a liquid hydrocarbon feedstock in a fluidized bed, comprising:

in a first reaction zone partially vaporizing the liquid hydrocarbon feedstock by contact with a hot particulate solid to form a partially vaporized hydrocarbon feedstock and a coke coating on the hot particulate solid with particles of the hot particulate solid being within group A of Geldart's classification;

moving effluents from the first reaction zone to a second reaction zone where vaporizing of the partially vaporized hydrocarbon feedstock occurs and contact with a particulate redox active mass distinct from the hot particulate solid causes combustion of the vaporized hydrocarbon feedstock and gas resulting from gasification of the coke coated on the hot particulate solid with particles of the particulate redox mass being within group B of Geldart's classification;

conveying effluents from the second reaction zone to a third reaction zone and therein continuing combustion of at least one of the partially vaporized liquid hydrocarbon feedstock and the gas resulting from gasification of the coke;

separating from a mixture of effluents in a separation zone of the third reaction zone a major part of the particulate redox active mass and a gas stream containing a major part of the hot particulate solid; and conveying effluents from the third reaction zone to a fourth reaction zone and carrying out therein reoxidation of the particulate redox active mass conveyed from the separation zone prior to sending at least part of the particulate redox active mass back to the second reaction zone.

2. A method as claimed in claim 1, wherein the hot particulate solid and the gas resulting from gasification are separated in the separation zone from the gas stream containing the major part of the hot particulate solid particles prior to sending the hot particulate solid back to the first reaction zone.

3. A method as claimed in claim 1, comprising atomizing the liquid hydrocarbon feed with a gas to form liquid droplets dispersed in the gas prior to contact with the hot particulate solid in the first reaction zone.

4. A method as claimed in claim 1, wherein:

the hot particulate solid is selected from a used catalytic cracking catalyst, petroleum coke, sand, and limestone.

5. A method as claimed in claim 1, wherein:
a size distribution of grains of the hot particulate solid and density of the hot particulate solid is lower than a distribution of grains of the particulate redox active mass and density of particles in the particulate redox active mass.

6. A method as claimed in claim 5, wherein:
a size distribution of grains of the hot particulate solid is that more than 90% of particles having a size ranging from between 50 micrometers and 150 micrometers, and a density thereof ranges between 1000 kg/m3 and 1500 kg/m3, a size distribution of grains of the particulate redox active mass is that more than 90% of the particles have a size ranging between 100 micrometers and 500 micrometers and a density thereof ranges between 2500 kg/m3 and 4500 kg/m3.

7. A method as claimed in claim 1, wherein:
a mass proportion of coke deposited on the hot particulate solid in the first reaction zone ranges between 1% and 20%.

8. A method as claimed in claim 1, wherein:
the hot particulate solid contacted with the liquid hydrocarbon feedstock in the first reaction zone has a temperature ranging between 600° C. and 1000° C.

9. A method as claimed in claim 1, wherein:
a superficial velocity of gas in the first reaction zone ranges between 1 m/s and 15 m/s and an average residence time for all particles in the first reaction zone ranges between 1 second and 20 seconds;
a superficial velocity of gas in the second reaction zone ranges between 0.3 m/s and 3 m/s and an average residence time for all particles in the second reaction zone ranges between 0.25 minutes and 20 minutes; and
a superficial velocity of gas in the third reaction zone ranges between 1 m/s and 30 m/s, an average residence time of the gas in the third reaction zone ranges between 1 second and 20 seconds, and an average residence time for all particles in the third reaction zone ranges between 2 seconds and 1 minute.

10. A system for chemical looping redox combustion of a liquid hydrocarbon feedstock carried out in a fluidized bed, comprising:
a first reaction zone in which the hydrocarbon liquid feedstock is partially vaporized and in which coke is deposited on a hot particulate solid and includes an injector of the liquid hydrocarbon feedstock, means for feeding the hot particulate solid to a second reaction zone, and means for injecting a fluidization gas;
the second reaction zone is disposed downstream from the first reaction zone in which the coke coated on the hot particulate solid is gasified and contacts a particulate redox active distinct from the hot particulate solid to combust vaporized liquid feedstock and gas resulting from gasification of the coke from contact with the hot particulate solid and comprises means for feeding the particulate redox active mass into the second reaction zone;
means for feeding effluents from the second reaction zone to a third reaction zone for completing combustion of at least one of the vaporized liquid feedstock and gas resulting from gasification of the coke coated on the hot particulate solid and includes a separation zone for separating from a mixture in the third reaction zone a major part of the particulate redox active mass and a gas stream containing a major part of the hot particulate solid, a delivery line for the mixture, a discharge of the particulate redox active mass, and an outlet for a gas stream containing the major part of the hot particulate solid; and
a fourth reaction zone for reoxidation of the particulate redox active mass obtained from the separation zone including means for feeding the particulate redox active mass from the separation zone to the fourth reaction zone, means for injecting an oxidation gas, and means for conveying a gas stream containing the particulate reoxidized redox active mass particles to the second reaction zone.

11. A system as claimed in claim 9, wherein:
the injector for injecting the liquid hydrocarbon feed of the first reaction zone comprises means for mixing the hydrocarbon liquid feed with an atomizing gas and means for atomizing the hydrocarbon liquid feedstock.

12. A system as claimed in claim 10, wherein:
the separation zone separates gas and solids within the third reaction zone from the hot particulate particles and the gas within a gas stream containing the major part of the hot particulate solid coming from the separation zone and recycles the hot particulate solid to the first reaction zone.

13. A system as claimed in claim 11, wherein:
the first, second and third reaction zones are successive parts in a single reactor, a first part of the single reactor being at a base of the single reactor comprising an elongated and vertical reaction zone opening into a second part of the single reactor at a center of the single reactor comprising the second reaction zone, the second part of the single reactor extending to a third part of the reactor comprising the third reaction zone which is elongated and vertical and an area of section of the second part of the reactor is greater than that aa area of a section of the first and third parts of the reactor.

14. A system as claimed in claim 10, wherein the first, second and third reaction zones are independent reactors connected by lines for transporting effluents between the zones.

* * * * *